United States Patent
Ishikawa

(10) Patent No.: US 7,489,416 B2
(45) Date of Patent: Feb. 10, 2009

(54) IMAGE PROCESSING APPARATUS

(75) Inventor: Atsushi Ishikawa, Osaka (JP)

(73) Assignee: Minolta Co., Ltd., Osaka (JP)

( * ) Notice: Subject to any disclaimer, the term of this patent is extended or adjusted under 35 U.S.C. 154(b) by 731 days.

(21) Appl. No.: 10/105,340

(22) Filed: Mar. 26, 2002

(65) Prior Publication Data

US 2002/0140960 A1 Oct. 3, 2002

(30) Foreign Application Priority Data

Mar. 27, 2001 (JP) .................... 2001-090476

(51) Int. Cl.
- G06F 3/12 (2006.01)
- G06K 15/00 (2006.01)
- H04N 1/00 (2006.01)
- H04N 1/387 (2006.01)
- H04M 11/00 (2006.01)

(52) U.S. Cl. .............. 358/1.16; 358/1.15; 358/402; 358/449; 379/93.15; 379/100.05; 379/100.08

(58) Field of Classification Search .......... 358/1.15, 358/1.13, 1.16, 1.05, 402, 449; 709/219, 709/236; 379/100.05, 100.08
See application file for complete search history.

(56) References Cited

U.S. PATENT DOCUMENTS

| | | | |
|---|---|---|---|
| 6,067,168 A | 5/2000 | Nishiyama et al. | 358/1.15 |
| 6,101,526 A | 8/2000 | Mochizuki | 709/200 |
| 6,459,499 B1 * | 10/2002 | Tomat | 358/1.15 |
| 6,574,670 B1 * | 6/2003 | Eguchi | 709/245 |
| 6,608,694 B1 * | 8/2003 | Akimoto | 358/1.15 |
| 6,735,618 B1 * | 5/2004 | Niwa | 709/207 |
| 2002/0051221 A1 * | 5/2002 | Wakabayashi | 358/402 |
| 2002/0138586 A1 * | 9/2002 | Paleiov et al. | 709/207 |

FOREIGN PATENT DOCUMENTS

| | | | | |
|---|---|---|---|---|
| GB | EP 0 865 179 A1 * | 9/1998 | | |
| JP | 6-103207 | 4/1994 | | |
| JP | 8-115278 | 5/1996 | | |
| JP | 2000-06924 | 3/2000 | | 1/32 |
| JP | 2000-259513 | 9/2000 | | |
| JP | 2001-7975 | 1/2001 | | |

OTHER PUBLICATIONS

Japanese Office Action issued Apr. 6, 2004, directed to a counterpart foreign application.

* cited by examiner

*Primary Examiner*—Edward L Coles
*Assistant Examiner*—Thomas J Lett
(74) *Attorney, Agent, or Firm*—Morrison & Foerster LLP

(57) ABSTRACT

An MFP can transmit image data read by a scanner by attaching it to E-mail. At the time of transmission, the image data input by the scanner and stored in a work memory is converted into mail data so as to be transmitted by E-mail, and the mail data is stored again into the work memory. The mail data is divided every predetermined reference data size into divided files which are sequentially transmitted as divided mails. When completion of transmission of divided mails corresponding to a unit image is confirmed, the image data and mail data of the unit image are eliminated from the work memory. By sequentially performing such a process, the memory use efficiency can be improved while holding image data of a unit image which has not been transmitted yet.

29 Claims, 11 Drawing Sheets

FIG. 6

| No. | DESTINATION ADDRESS | IMAGE NUMBER | DIVIDED MAIL | TRANSMITTER | TRANSMITTER INDICATION |
|---|---|---|---|---|---|
| 1 | aaa@bbb.co.jp | 1 | 1, 2 | abc@aaa.co.jp | ON |
|  |  | 2 | 2, 3, 4 |  |  |
|  |  | 3 | 4 |  |  |
|  |  | 4 | 4, 5 |  |  |
|  |  | 5 | 5 |  |  |
| ⋮ | ⋮ | ⋮ | ⋮ | ⋮ | ⋮ |

SB

IMAGE PROCESSING APPARATUS

This application is based on application No. 2001-090476 filed in Japan, the contents of which are hereby incorporated by reference.

BACKGROUND OF THE INVENTION

1. Field of the Invention

The present invention relates to a technique of transmitting image data.

2. Description of the Background Art

As one of conventional image processing apparatuses capable of performing communication through a network, an MFP (Multi Function Peripheral) is known. The MFP is a composite device having the functions of scanner, copier, printer, facsimile, and the like. Further, the MFP can attach an image read by the scanner function or the like to electronic mail (E-mail) and directly transmit the resultant to an MFP or the like at the destination via a network such as the Internet or a LAN.

In the case of transmitting E-mail from a transmission source to a destination, it is transmitted via a plurality of mail servers. In each mail server, a system administrator sets a size limit for E-mail. For example, when E-mail exceeding the size limit arrives, the E-mail may be rejected. Which one of the mail servers through which the E-mail passes rejects the E-mail is not determined.

The size of image data is increasing and, particularly, the size of color image data is enormous which is about 60 MB per image and may exceeds the size limit for E-mail set by a mail server. Consequently, an image to be transmitted is preliminarily divided by a transmission source so that the size does not exceed the size limit for E-mail, for example, 500K to 2 MB, each of the divided images is attached to E-mail, and the resultant is transmitted by divided mail to the destination.

The Internet is an infrastructure which does not guarantee data transmission to a destination and in which transmission data may be dropped out. There is consequently the possibility that any of the plurality divided mails to which the divided images are attached is not transmitted.

At the time of transmitting an image from a transmission source to a destination, generally, for example, when the page number of the image is associated with a management number of divided mail and it is determined that all of the divided mails are received by the destination, the image attached to all of the divided mails is printed/output. On completion of the printing/outputting, all of the divided mails are deleted. In such a manner, an error in E-mail transmission is detected. In the case of addressing the problem by the transmission source, all of the divided mails transmitted may be held for predetermined time.

However, some MFPs do not have a memory capacity sufficient to hold all of divided mails (image data) transmitted. In a general mail server, E-mail which is received by the transmission destination is deleted from the mail server.

Therefore, for example, when a unit image is divided into a plurality of images, a plurality of divided mails to which divided images are attached are transmitted, and even one of the divided mails is not delivered, if the MFP does not hold the transmitted image, the unit image has to be read again by the scanner function.

Although divided mails whose non-delivery notifications are not sent from the mail server may be sequentially deleted, if even one of the divided mails to which the divided images of the unit image is not delivered, the unit image has to be read by scanning. It is troublesome for the user to re-transmit the image by confirming a not-delivered unit image, setting the original, and the like.

Although image data is converted into a data format which can be attached to E-mail and the resultant data is attached to E-mail, even if the image data is stored, an image of the format attached to E-mail is held in a memory only at the time of transmitting the E-mail. Consequently, when the E-mail is not delivered, the format conversion has to be re-executed.

SUMMARY OF THE INVENTION

The present invention is directed to an image processing apparatus capable of transmitting image data.

According to the invention, an image processing apparatus includes: an image input part for inputting image data; a converter for converting plural image data of a unit image obtained by the image input part into one file for transmission; a memory device for storing the file for transmission obtained by conversion of the converter; a divider for dividing the file for transmission into a plurality of divided files when data size of the file for transmission exceeds predetermined data size; a transmitter for sequentially transmitting the plurality of divided files via a network; a transmission completion detector for detecting completion of transmission of the file for transmission; and a memory device controller for allowing a file for transmission corresponding to a unit image which has not been transmitted yet to be held in the memory device and, when completion of transmission of a file for transmission is detected by the transmission completion detector, deleting a file for transmission corresponding to the transmitted unit image from the memory device.

On completion of transmission of a unit image, a file for transmission corresponding to the transmitted unit image is deleted, thereby enabling the memory to be efficiently used. Since a file for transmission corresponding to a unit image which has not been transmitted yet is held, even when any of the divided files is not delivered, it can be efficiently re-transmitted.

According to an aspect of the invention, the file for transmission includes a sequence of the plural image data of a unit image, and the divider divides the file for transmission in a border of unit images in the sequence.

By dividing a file for transmission in the border of unit images, the file for transmission corresponding to the unit image can be efficiently deleted.

According to another aspect of the invention, the transmission completion detector determines completion of transmission of each unit image after elapse of predetermined time since transmission of each of the plurality of divided files to the network.

Since the file for transmission is held for predetermined time after the unit image is transmitted, even when any of the divided files is not delivered, it can be transmitted again more efficiently.

The invention is also directed to a method of transmitting image data.

The invention is also directed to a computer program product.

The invention is also directed to a computer-readable medium storing a program for controlling a computer to perform a method of processing image.

Therefore, an object of the invention is to improve the efficiency of use of a memory at the time of transmitting an image.

Another object of the invention is to improve the efficiency of re-transmission of a divided file when the divided file is not transmitted.

These and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a diagram showing an example of a transmission box.

DESCRIPTION OF THE PREFERRED EMBODIMENTS

Definition of Terms

Figure 1:
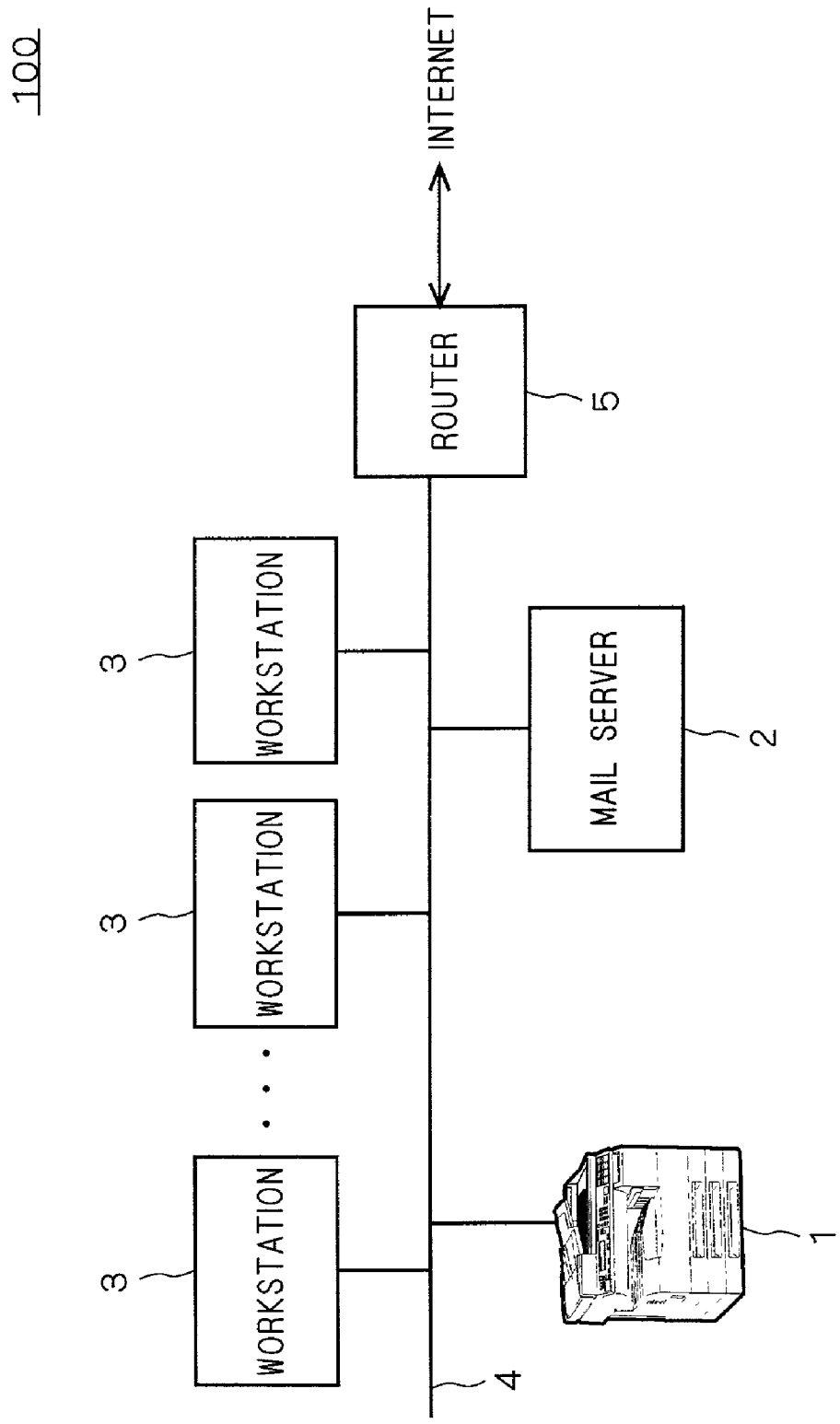
FIG. 1 is a diagram showing an example of a network system applied to a preferred embodiment of the invention.

The term "unit image" in the specification denotes an image printed as the image of an original in an apparatus having an image printer as a transmission destination of an image, or an image which is input as the image of an original in an apparatus having an image input part as a transmission source of an image. In the specification, "page" is used as the unit. The unit image may be any of compressed image data, non-compressed image data, and image data in a format for E-mail transmission.

Preferred Embodiments of the Invention

Referring to the drawings, preferred embodiments of the invention will be described hereinbelow.

First Embodiment

Network System

FIG. 1 shows an example of a network system applied to a preferred embodiment of the invention.

As shown in the drawing, a network system 100 has an MFP 1 as an image processing apparatus according to the preferred embodiment of the invention, a mail server 2, and a plurality of workstations 3 each connected to a local area network (hereinbelow, "LAN") 4. The LAN 4 is also connected to an external network such as the Internet via a router 5.

The mail server 2 provides known services of collection and distribution of E-mail. The workstation 3, MFP 1, and the like connected to the LAN 4 transmit/receive E-mail to/from an external device connected to a network such as the LAN 4 and the Internet via the mail server 2. For example, in the case of transmitting E-mail from the MFP 1, first, E-mail is transmitted to the mail server 2. Further, the E-mail transmitted to the mail server 2 is received by an external device at a transmission destination via a plurality of mail servers as relay servers on the Internet. That is, the MFP 1 performs a connection-less communication which does not involve negotiation and confirmation of delivery with the external device at the transmission destination.

Apparatus Configuration

Figure 2:
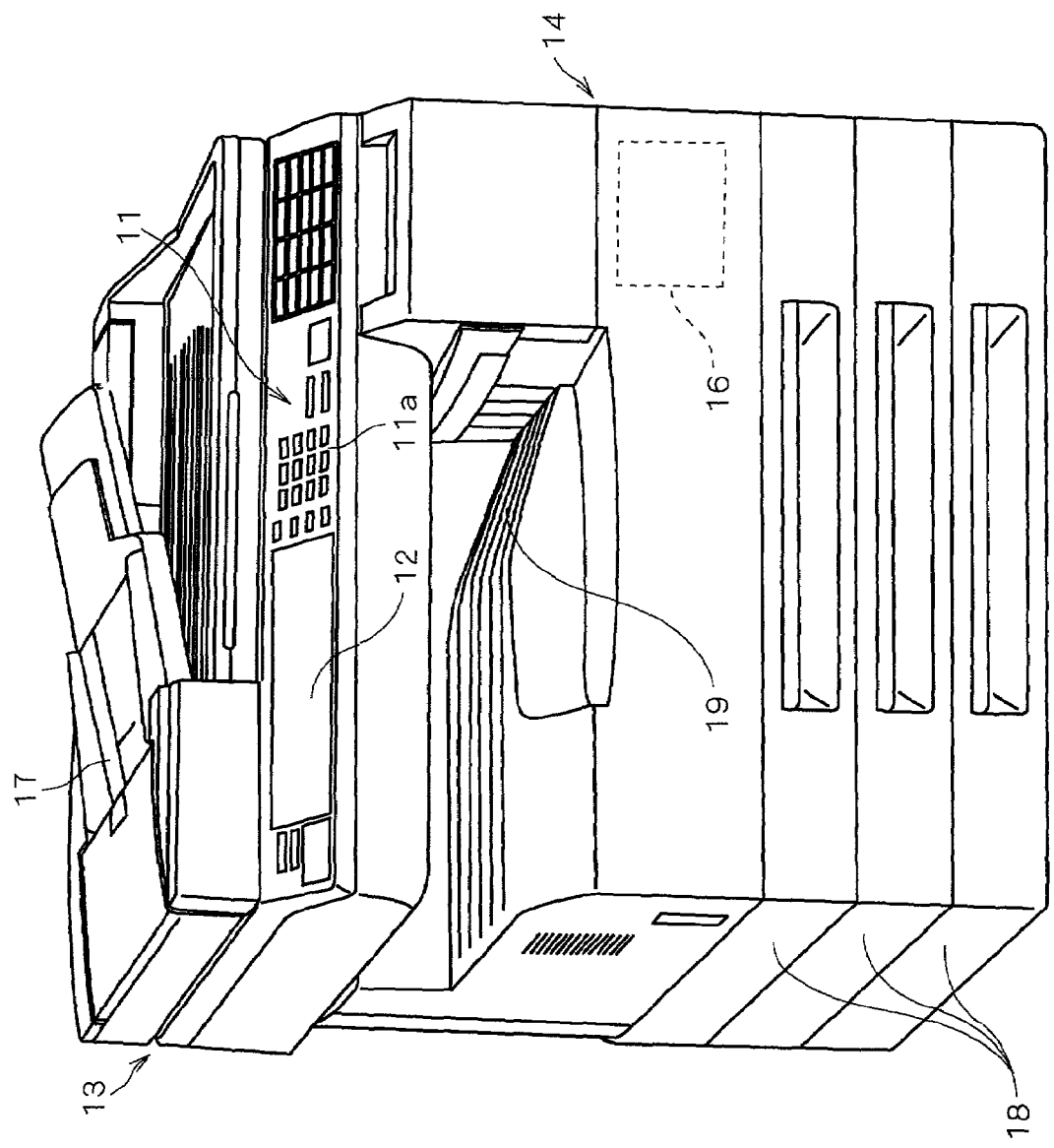
FIG. 2 is an external view of an MFP as an image processing apparatus according to the preferred embodiment of the invention.

FIG. 2 is an external view of the MFP 1. As shown in FIG. 2, the MFP 1 has an operation part 11 for receiving various instructions and inputs of data such as characters and numerical values by the operation of the user, a display 12 for displaying an instruction menu to the user, information regarding an obtained image, and the like, a scanner 13 for photoelectrically reading an image to obtain image data, and a printer 14 for printing an image onto a recording sheet on the basis of the image data.

The MFP 1 also has a feeder 17 for feeding an original to the scanner 13 on the top face of the body of the MFP 1, a paper feeder 18 for supplying a recording sheet to the printer 14 in the lower part, a tray 19 to which the recording sheet on which an image is printed by the printer 14 is ejected in the center part, and a communication part 16 for transmitting/receiving an image or the like to/from an external device via a network on the inside.

The display 12 is used for displaying various information including an instruction menu related to E-mail. The operation part 11 has a plurality of keys 11a by which various inputs including selection of the instruction menu related to E-mail can be entered. Those components function as main components of the user interface. The user can enter various information by using the operation part 11 while recognizing data displayed on the display 12.

The scanner 13 photoelectrically reads image information such as photograph, character, and picture from an original and converts the image information into electric signals, thereby obtaining the image information as image data in a predetermined format (for example, a bit map format). The image data obtained by the scanner 13 is attached to E-mail and transmitted by the communication part 16 or printed onto a recording sheet by the printer 14. That is, the MFP 1 also functions as a copier.

The printer 14 prints an image onto a recording sheet on the basis of the image data obtained by the scanner 13 or image data received from an external device by the communication part 16.

The communication part 16 transmits/receives facsimile data via a public telephone line and transmits/receives E-mail to/from an external device connected to a network such as a LAN or the Internet via the network. Consequently, the MFP 1 has the function of a facsimile for performing a normal facsimile communication and also the function of a terminal for transmitting/receiving E-mail.

Figure 3:
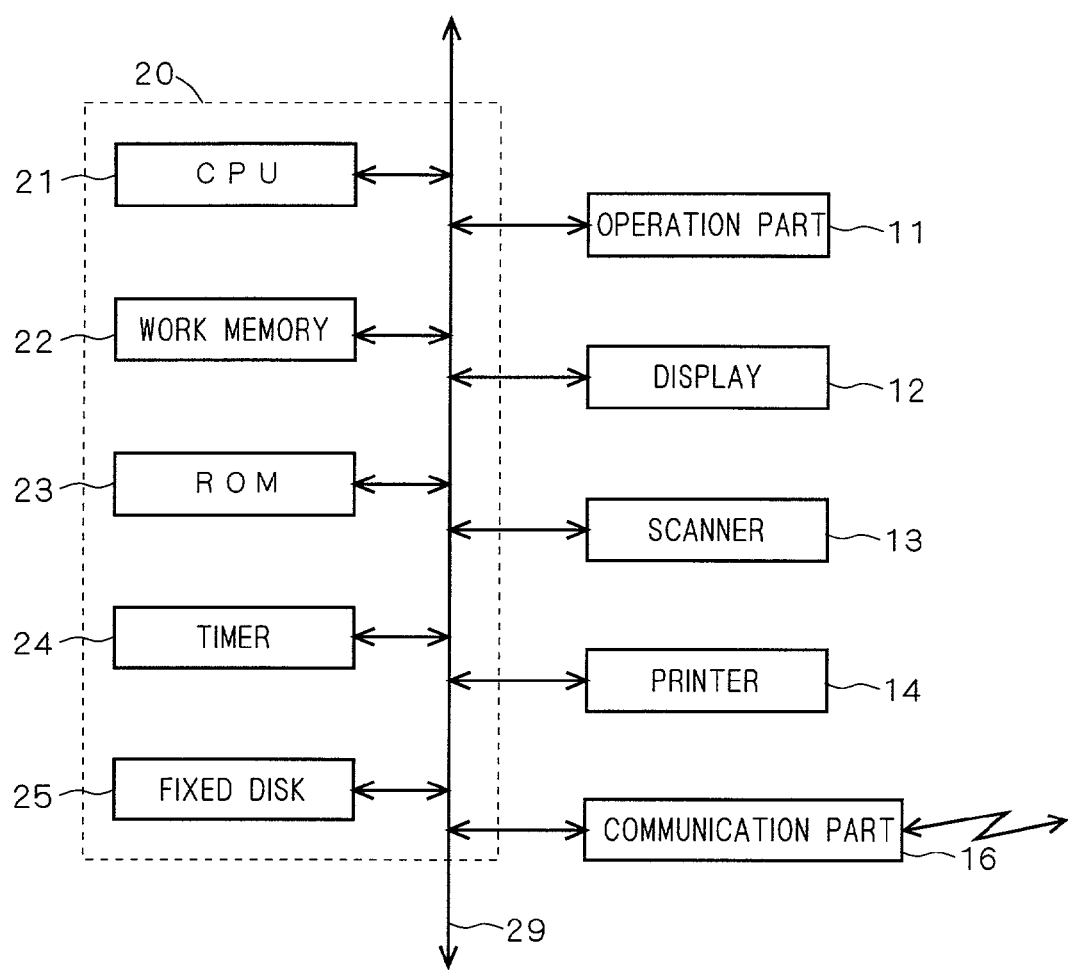
FIG. 3 is a block diagram showing a schematic configuration of a controller of the MFP.

The MFP 1 has therein a controller for controlling the whole apparatus. FIG. 3 is a block diagram showing a schematic configuration of the controller of the MFP 1. A controller 20 of the MFP 1 takes the form of a microcomputer, and has a CPU 21 as the main part, a work memory 22 as a memory such as an RAM from/to which data can be read/written as a work area, a ROM 23 in which a control process program and the like are stored, a timer 24 having a clock function, and a fixed disk 25 for storing various information such as transmission log of E-mail and the like. Those components of the controller 20 are electrically connected to each other via a bus line 29. To the bus line 29 of the controller 20, the operation part 11, display 12, scanner 13, printer 14, communication part 16, and the like are also electrically connected.

The work memory 22 serves as a work area of a computing process of the CPU 21 and also an area in which image data read by the scanner 13 and a file for transmission obtained by converting the image data so as to be transmitted by E-mail.

In the controller 20, by performing a computing process by the CPU 21 in accordance with the control process program stored in the ROM 23, various processes according to inputs from the operation part 11 and a control of the operation of each of the components of the MFP such as the scanner 13 and communication part 16 are executed. The function realized by the control process program includes the various processes related to transmission and reception of E-mail.

The MFP 1 transmits/receives data to/from an external device connected to a network such as a LAN or the Internet by combining a transmission protocol used up to a transport layer called TCP/IP and a communication protocol of a layer upper than the transport layer. For example, at the time of transmitting E-mail, an SMTP protocol is applied as the communication protocol of the upper layer.

Figure 4:
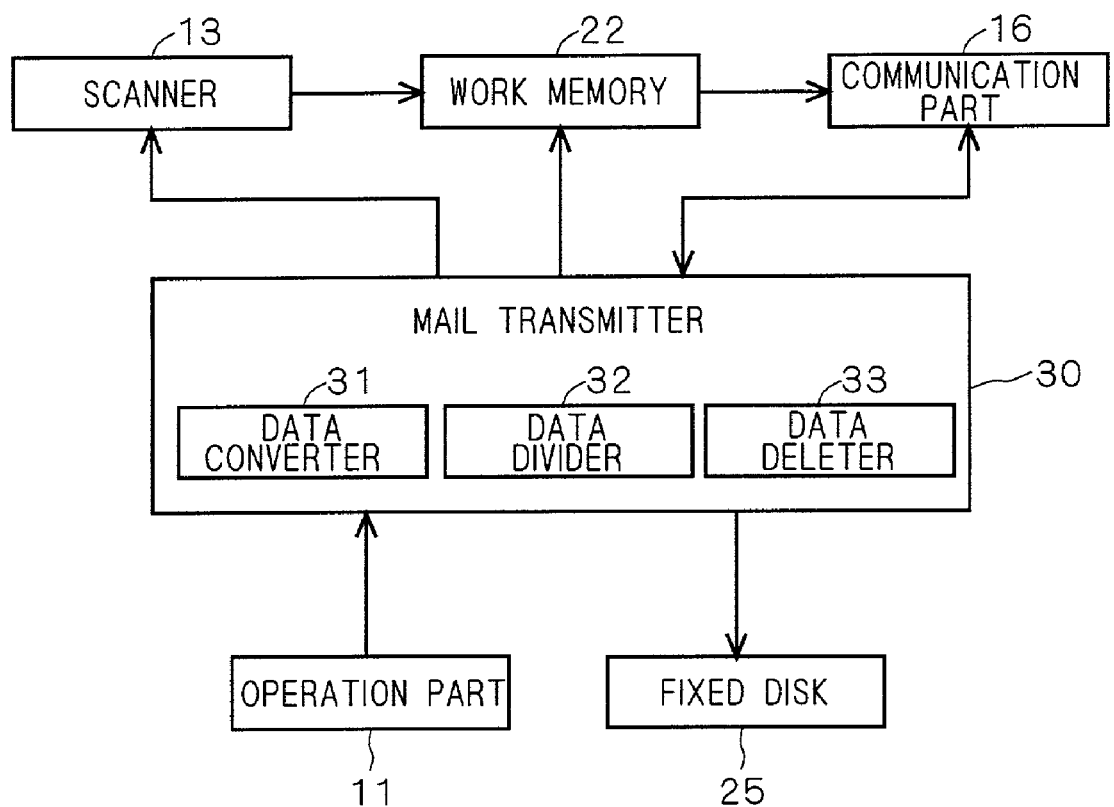
FIG. 4 is a block diagram showing a part of the functional configuration of the MFP.

FIG. 4 is a block diagram showing, as a mail transmitter, the function related to transmission of E-mail as one of functions realized by the control process program together with the other configuration.

A mail transmitter 30 manages E-mail to be transmitted in a centralized manner. The mail transmitter 30 generates a transmission box as a table for managing various setting information such as a destination address, image data to be attached, and a transmitter address for each E-mail to be transmitted, and manages E-mail to be transmitted on the basis of the transmission box. The setting information of the transmission box includes information entered by the user through the operation part 11.

On the basis of the transmission box, the mail transmitter 30 controls reading of image data in the scanner 13, performs a process which will be described hereinlater on image data stored in the work memory 22 and, after that, transmits the resultant by E-mail in conformity with the SMTP protocol via the communication part 16. Further, after completion of transmission of E-mail, a transmission log as a transmission record of E-mail is generated and stored into the fixed disk 25.

The mail transmitter 30 has, as shown in FIG. 4, a data converter 31, a data divider 32, and a data deleter 33 each for performing a process on the image data stored in the work memory 22.

The data converter 31 converts image data of a unit image stored in the work memory 22 into a file for transmission of the unit image for the purpose of transmission in E-mail. Since E-mail cannot directly include binary data, image data (bit map data) obtained by the scanner 13 cannot be transmitted as it is by E-mail. Consequently, first, the image data is converted to compressed image data by a compressing process according to an MH encoding method, thereby obtaining compression image data in the TIFF format (hereinbelow, called "TIFF data") and, further, the TIFF data is converted by an encoding method such as MIME (base64) into MIME encoded data of an ASCII code (hereinbelow, called "ASCII data"). The TIFF data and ASCII data obtained by the conversions are stored into the work memory 22.

Figure 5:
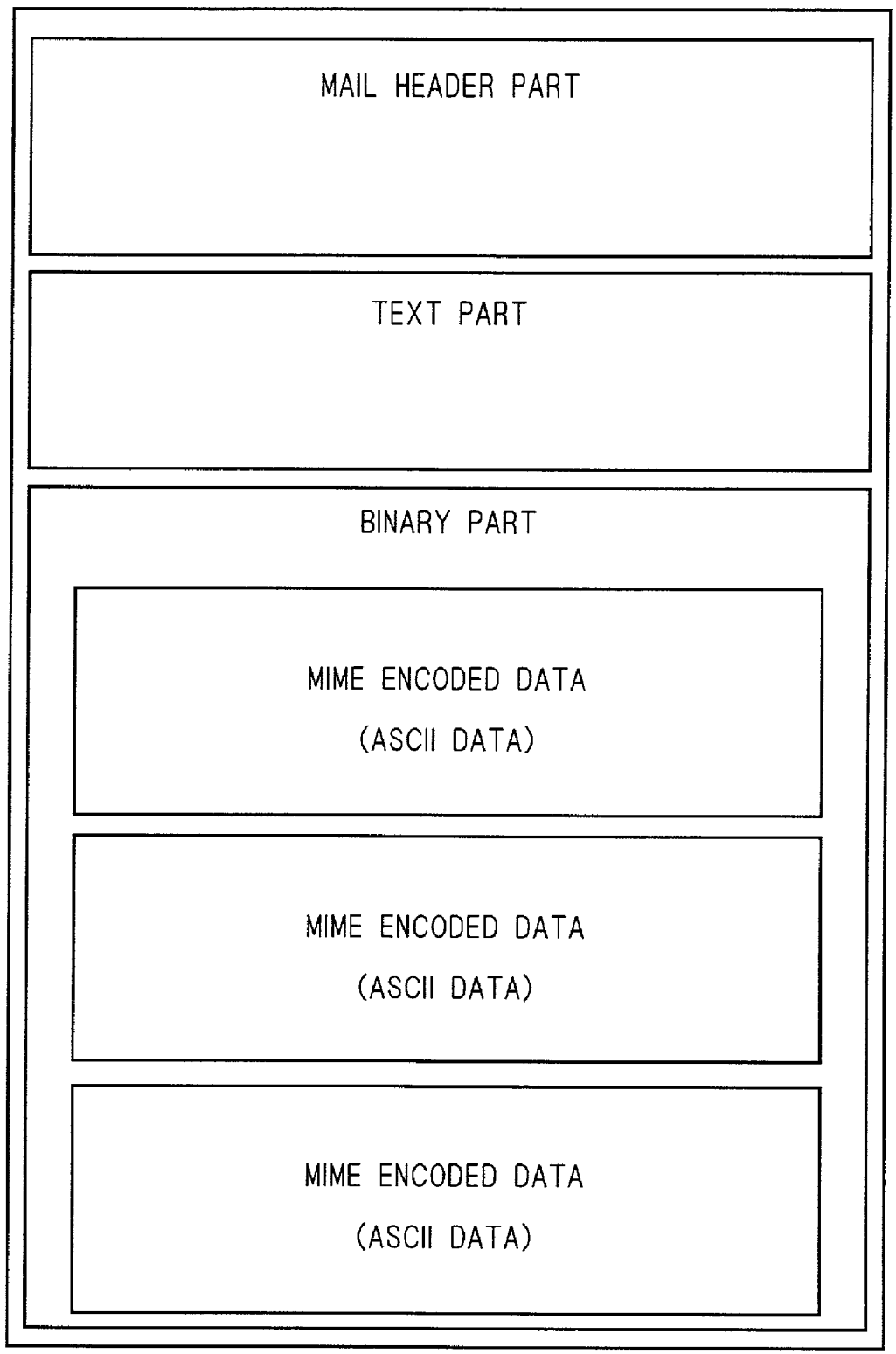
FIG. 5 is a diagram showing an example of E-mail used to send an image.

FIG. 5 shows an example of E-mail used at the time of transmitting an image. The E-mail is E-mail of a multi-part MIME format having a plurality of text parts which are a mail header part including predetermined information such as transmission date of the E-mail, destination address, and transmission source address, a text part for carrying text information, and a binary part for carrying image information. In the binary part, MIME encoded data (ASCII data) obtained by converting the image data is disposed.

In the TIFF format, a plurality of unit images can be formed in a file, so that the ASCII data obtained by conversion can be also formed in a file. That is, in the binary part of E-mail, a sequence of ASCII data of a plurality of unit images can be combined and placed as a file for transmission. To each unit image, header information and footer information is added, and the boundary between neighboring unit images can be recognized by the header information and footer information. In the following, the TIFF data and ASCII data will be generically called "mail data".

In a mail server in the Internet, as described above, the system administrator sets the upper limit value of about 1 Mbyte as the size of data which can be transmitted per E-mail. In order to avoid a rejection of E-mail in a mail server, when the size of E-mail exceeds a predetermined reference data size (1 Mbyte in the example), the data divider 32 divides the E-mail. More concretely, when the size of ASCII data obtained by converting image data to be attached to E-mail is equal to or larger than the predetermined reference data size, the data is divided on the unit basis of the predetermined reference data size into a plurality of divided files. E-mail is divided into files from the head of ASCII data of the sequence every reference data size. The divided files are managed by ID numbers.

To each of the plurality of divided files, the mail header is added by the mail transmitter 30 to thereby obtain a divided mail. The divided mails are sequentially transmitted by the communication part 16. In such a manner, the data size of E-mail can be suppressed. Without being influenced by the limitation of the size of data which can be transmitted per E-mail, which is used in the mail servers positioned in the transmission path of the E-mail, an image can be properly transmitted.

On completion of transmission of divided mails corresponding to a unit image in the communication part 16, the data deleter 33 deletes image data and mail data corresponding to the unit image from the work memory 22. Whether transmission of the divided mails corresponding to the unit image has been completed or not is determined by referring to the transmission box.

FIG. 6 shows an example of the transmission box. As shown in the diagram, a transmission box SB has a plurality of fields.

In a "No." field, a peculiar ID number for identifying E-mail transmitted by the MFP 1 is indicated. The number is automatically assigned in accordance with the order of registration of E-mail.

In a "destination address" field, an address as a destination of an E-mail is indicated, which is designated by the operation of the operation part 11 by the user. In the diagram, only one destination address is shown for one E-mail, but a plurality of destination addresses can be designated.

An "image number" field shows page number of each unit image of image data attached. The page number is automatically assigned to each unit image when an image is captured by the scanner 13.

A "divided mail" field indicates the ID number of divided mail and indicates the positions in which the divided mail(s)

of the unit image shown in the "image number" field is/are stored. For example, in the drawing, data in the "divided mail" field corresponding to "1" in the "image number" field are "1, 2". It indicates that the unit image of the first page is divided into the first and second divided mails which are stored. In this case, when transmission of the first and second divided mails is completed, it means that transmission of the unit image of the first page is completed. By referring to the "image number" field and the "divided mail" field, the data deleter 33 determines that the divided mails corresponding to the unit image are transmitted. Data in the "divided mail" field are automatically generated when E-mail is divided by the data divider 32.

The "transmitter" field indicates an E-mail address of the user himself/herself who transmits the E-mail. A "transmitter indication" field indicates whether or not the address of the user himself/herself is to be indicated in the mail header of E-mail transmitted. In the case where the "transmitter indication" is "ON", the address of the user himself/herself entered by the user via the operation part 11 is indicated in the mail header. In the case where the "transmitter indication" is "OFF", an address preliminarily assigned to the MFP 1 is indicated in the mail header.

Transmitting Process

Figure 7:
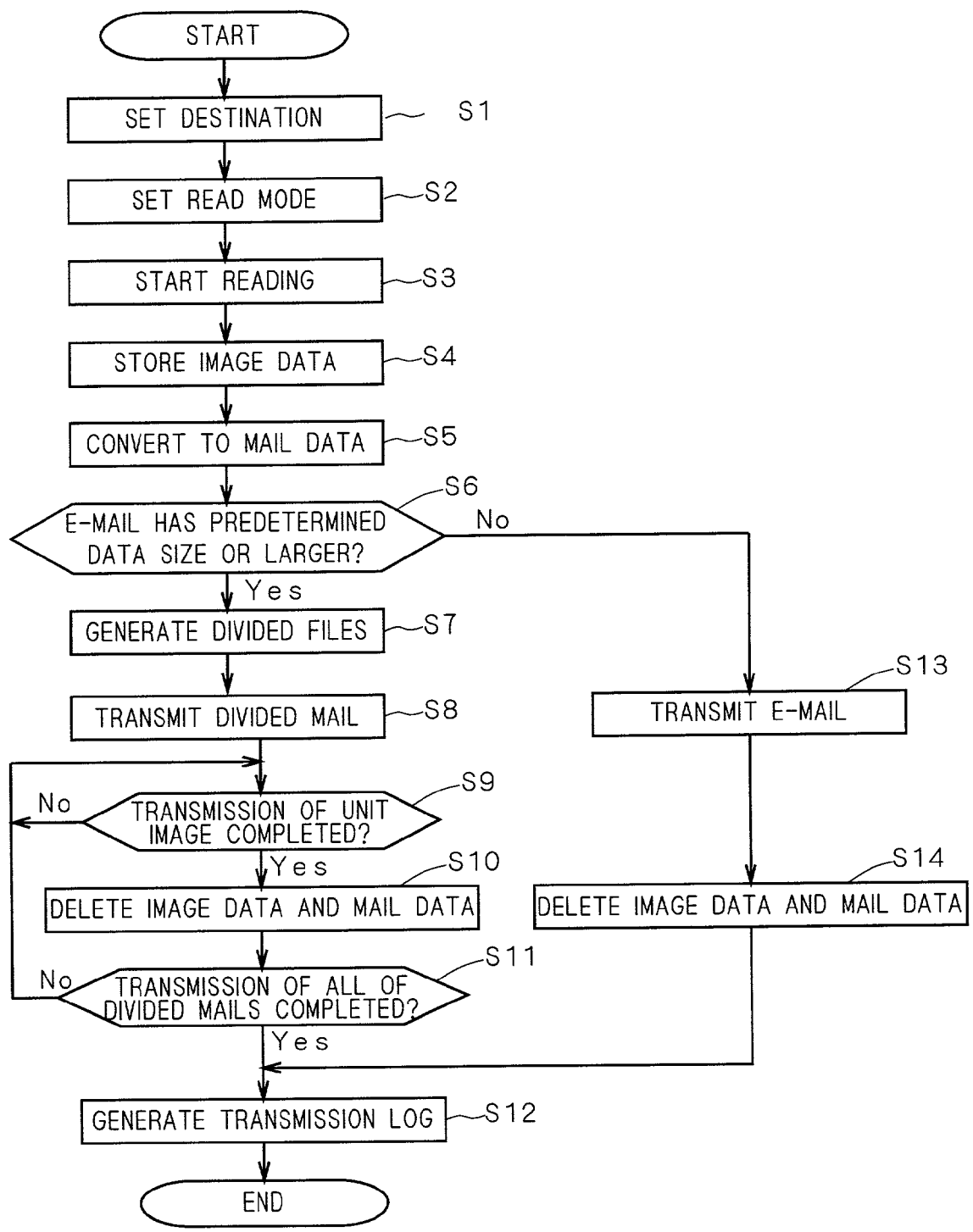
FIG. 7 is a diagram showing the flow of E-mail transmitting process.

A process of transmitting E-mail to which image data is attached performed by the MFP 1 constructed as described above will now be described. FIG. 7 is a flowchart of the E-mail transmitting process.

When E-mail transmission is instructed by operation of the operation part 11 by the user, an input screen of E-mail setting information is displayed on the display 12. The user operates the operation part 11 by referring to the display 12 and enters the address of the destination of E-mail, the user's address, "ON" or "OFF" in the "transmitter indication", and the like (step S1). Based on the information entered at this time, the mail transmitter 30 generates data in the transmission box SB for the E-mail.

Subsequently, a screen for setting information such as a mode of reading an original as image data to be attached to the E-mail is displayed on the display 12 (step S2). In the reading mode setting screen, information such as the size of an original to be read, resolution, color (monochromatic/color), and the like of image data obtained by reading the original is set via the operation part 11.

Subsequently, N (N≧1) originals are set in the feeder 17 by the user. On the basis of the information set in the reading mode setting screen, the originals are read by the scanner 13 under control of the mail transmitter 30 (step S3), and image data is stored into the work memory 22 (step S4). In the preferred embodiment, one original is obtained as image data of a unit image, so that image data of N pages is stored. That is, image data of the unit images of N pages is entered.

Subsequently, the obtained image data is converted into mail data by the data converter 31 (step S5). The image data of N pages is converted to one file made of TIFF data. Further, the file is converted into one file made of ASCII data and the file is stored into the work memory 22.

In the data divider 32, whether the mail data has a predetermined data size or larger is determined (step S6). If "Yes", the mail data is divided into a plurality of divided files by the data divider 32 (step S7).

Figure 8:
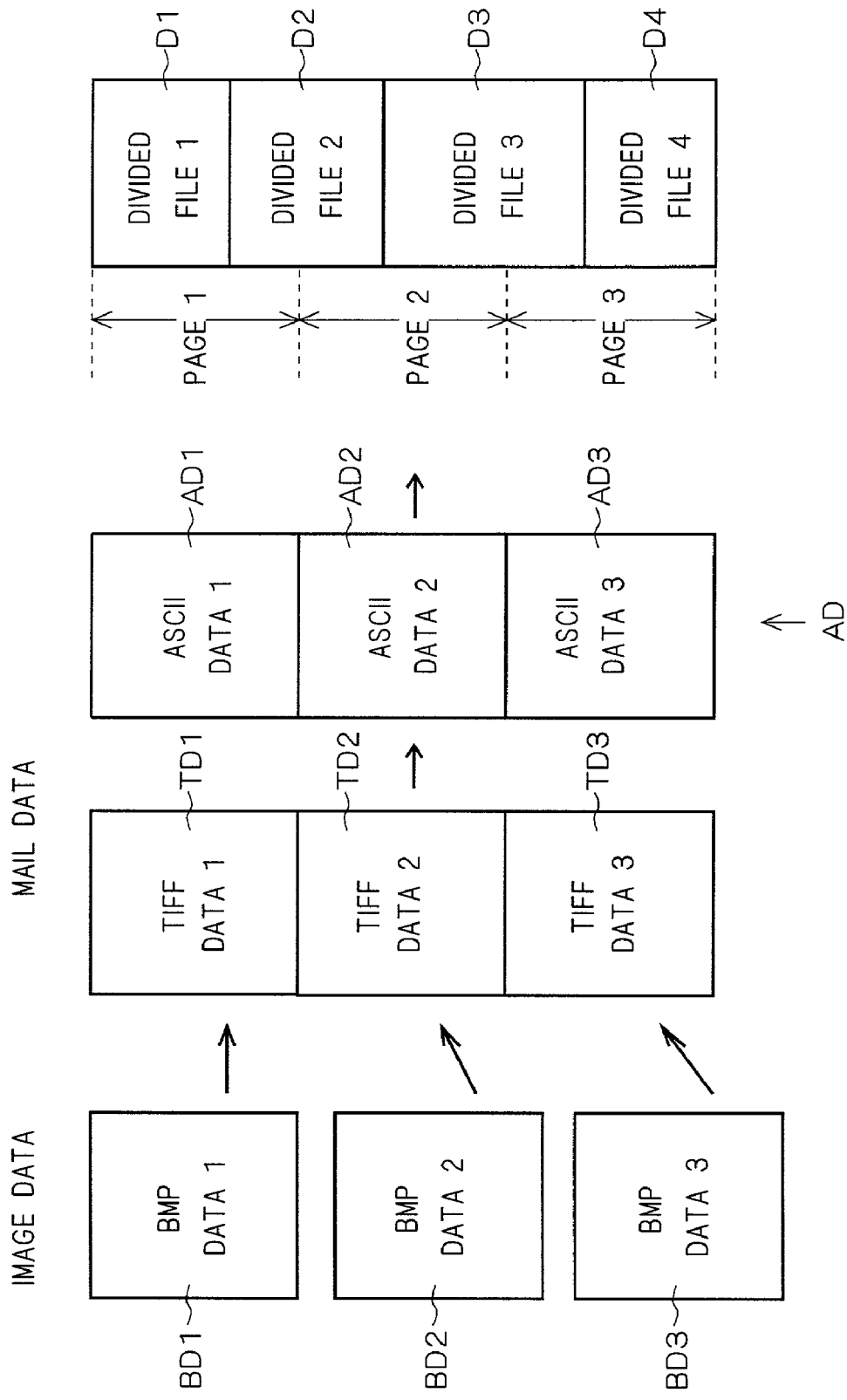
FIG. 8 is a conceptual diagram showing conversion of image data in a first preferred embodiment.

FIG. 8 is a conceptual diagram showing that the obtained image data are converted into mail data and the mail data is divided into divided files. FIG. 8 shows a case, as an example, where image data of three pages are attached to E-mail. As shown in the diagram, image data BD1 to BD3 are converted to TIFF data TD1 to TD3, respectively, and the TIFF data TD1 to TD3 are converted into ASCII data AD1 to AD3, respectively. A file AD constructed by the ASCII data of three pages is further divided into divided files D1 to D4 on the unit basis of predetermined reference data size.

Since the divided files D1 to D4 are obtained by diving data on the unit basis of the reference data size, the file AD is not always divided at the boundaries of unit images. In the example of the drawing, the unit image of the first page is divided into the first divided file D1 and the second divided file D2. The unit image of the second page is divided into the second divided file D2 and the third divided file D3. The unit image of the third page is divided into the third divided file D3 and the fourth divided file D4. That is, the second divided file D2 includes a part of the unit image of the first page and a part of the unit image of the second page. The third divided file D3 includes a part of the unit image of the second page and a part of the unit image of the third page.

Referring again to FIG. 7, in step S8, a mail header is added to each of the generated divided files by the mail transmitter 30, thereby obtaining divided mail. The divided mails are sequentially transmitted from the first divided mail in conformity with the SMTP protocol by the communication part 16. Concretely, the communication part 16 establishes connection with the mail server 2 (refer to FIG. 1). After establishing the connection, one divided mail is started to be transmitted to the mail server 2. After completion of transmission of the divided mail, the MFP 1 receives a transmission completion signal sent from the mail server 2 and confirms that the transmission is completed without a transmission error. When a notification of non-delivery of the divided mail is not transmitted from the mail server 2 after elapse of predetermined time since the transmission of the divided mail is finished from the MFP 1, completion of the transmission may be determined. It is also possible to receive the transmission completion signal after the divided mail from the mail server 2 is transmitted. Not the transmission completion signal from the mail server 2 but a transmission completion signal from a mail server for receiving and relaying the divided mail transmitted from the mail server 2 may be received.

After confirming completion of transmission of one divided mail, the communication part 16 notifies the data deleter 33 of completion of transmission of the divided mail together with the ID number of the divided mail. The data deleter 33 receives the notification, refers to the transmission box SB, and determines whether transmission of the divided mails corresponding to the unit image have been completed or not (step S9).

If transmission of the divided mails corresponding to the unit image have not been completed yet, the program returns to step S8, and the next divided mail is transmitted by the communication part 16. On the other hand, if transmission of the divided mails corresponding to the unit image have been completed, the data deleter 33 deletes the image data and mail data corresponding to the unit image from the work memory 22 (step S10).

Subsequently, whether or not transmission of all of divided mails has been completed is determined by the mail transmitter 30 (step S11). If the transmission of all of the divided mails has not be completed yet, the process returns to step S8 and the next divided mail is transmitted by the communication part 16.

By a similar process, the divided mails are sequentially transmitted. If transmission of a unit image has been completed on completion of transmission of the divided mails, the image data and mail data corresponding to the unit image is deleted, and all of divided mails are transmitted finally.

Figure 9:
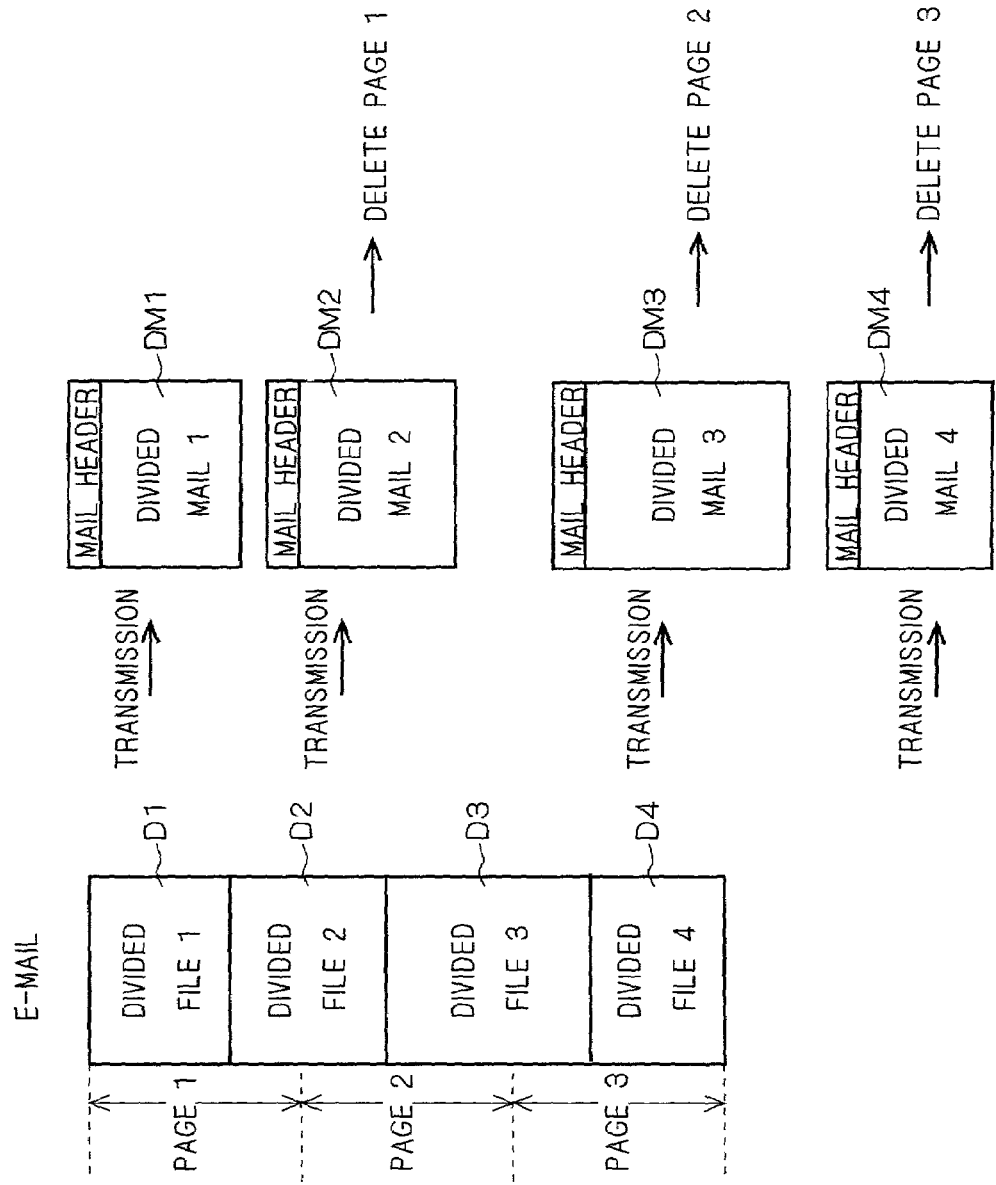
FIG. 9 is a conceptual diagram showing transmission of divided mails.

FIG. 9 is a conceptual diagram showing that the divided files D1 to D4 shown in FIG. 8 are sequentially transmitted by divided mail. Since transmission of the unit image of the first page has not been completed on completion of transmission of the first divided mail DM1, the image data and the like are not deleted. Since transmission of the unit image of the first page is completed on completion of transmission of the second divided mail DM2, the image data BD1 of the first page and the mail data TD1 and AD1 are deleted. Similarly, on completion of the transmission of the third divided mail DM3, the image data BD2 of the second page and mail data TD2 and AD2 are deleted. On completion of transmission of the fourth divided mail DM4, the image data BD3 of the third page and mail data TD3 and AD3 are deleted. In such a manner, after confirming completion of transmission of a unit image, the image data and mail data corresponding to the unit image are deleted.

Referring again to FIG. 7, in step S12, the mail transmitter 30 associates transmission completion time obtained from the timer 24 with the data in the transmission box SB for the E-mail, stores the resultant as a transmission log into the fixed disk 25, and finishes the E-mail transmitting process.

In step S6, if the data size of the mail data is less than the predetermined reference data size, it is unnecessary to divide the mail data, so that the mail data is transmitted by E-mail by the communication part 16, without being divided (step S13). After completion of transmission of the E-mail, all of the image data and mail data are deleted (step S14), a transmission log is generated (step S12), and the E-mail transmitting process is finished.

The first preferred embodiment has been described above. In the image processing apparatus, after confirming completion of transmission of divided files corresponding to a unit image, the image data and mail data corresponding to the unit image are deleted. Thus, the improved efficiency of use of the work memory 22 can be achieved. Since the image data and mail data are held as a unit image, even when any of divided mails is not delivered, the divided mail can be efficiently re-transmitted.

Second Preferred Embodiment

A second preferred embodiment of the invention will now be described. Although the divided files are not always divided in the borders of unit images in the first preferred embodiment, in the second preferred embodiment, the divided files are positively divided in the borders of the unit images. The configuration of the image processing apparatus in the preferred embodiment is similar to that in any of FIGS. 2 to 4. The flow of the E-mail transmitting process is also similar to that shown in FIG. 7. Since only the E-mail dividing method in the data divider 32 is different, only this part will be described.

The data divider 32 of the second preferred embodiment does not simply divide ASCII data of a plurality of unit images in one file every predetermined reference data size. When a border between unit images exists, the data is always divided in the border. The division is made by confirming the header information and footer information existing in borders of the unit images.

Figure 10:
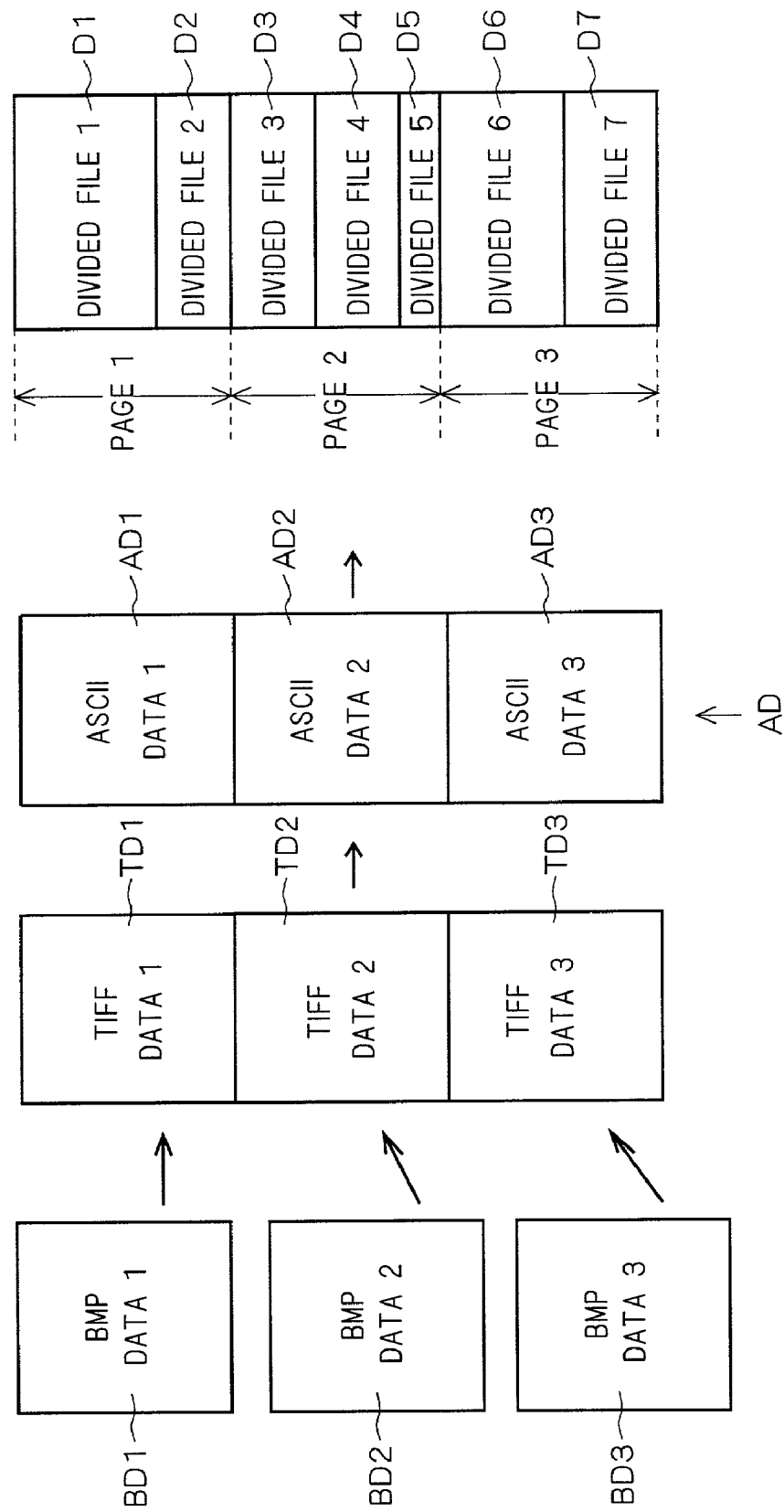
FIG. 10 is a conceptual diagram showing conversion of image data in a second preferred embodiment.

FIG. 10 is a conceptual diagram showing that the obtained image data are converted to mail data and the mail data is divided into divided files in the second preferred embodiment. In a manner similar to the first preferred embodiment, FIG. 10 shows the case, as an example, where image data of three pages are attached to E-mail. Image data BD1 to BD3 are converted to TIFF data TD1 to TD3, respectively, and the TIFF data TD1 to TD3 are further converted to ASCII data AD1 to AD3, respectively.

The file AD constructed by the plural ASCII data is sequentially divided from the head of the file every predetermined size in a data divider 32. When a border of unit images exists, the file is also divided in the border. In the example of the diagram, the unit image of the first page is divided into the divided files D1 and D2, the unit image of the second page is divided into the divided files D3, D4, and D5, and the unit image of the third page is divided into the divided files D6 and D7. That is, one divided file includes information of only a specific unit image.

The divided files are sequentially transmitted by divided mail in a manner similar to the first preferred embodiment. As described above, by dividing the file in the borders of the unit images, the image data and mail data of a unit image can be promptly deleted, so that the work memory 22 can be used more efficiently. Since the image data and the mail data are held as a unit image, even when any of the divided mails is not delivered, it can be efficiently re-transmitted.

Other Preferred Embodiments

In the foregoing preferred embodiments, at the time of transmission of each of the divided mails, completion of transmission of each unit image is determined by the transmission completion signal sent from the mail server 2. It is also possible to determine completion of transmission of each unit image after elapse of predetermined time since the time when the transmission completion signal is received.

Figure 11:
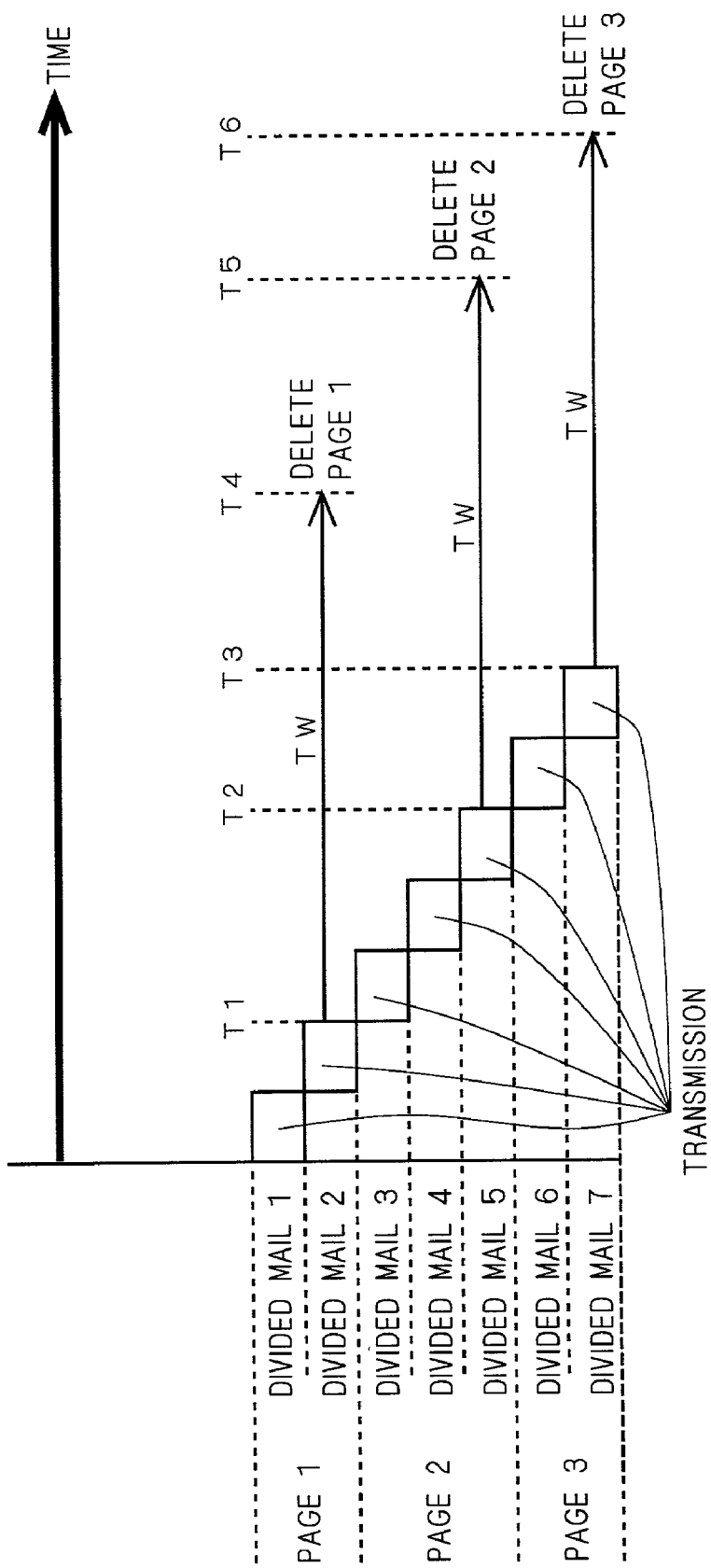
FIG. 11 is a diagram showing timings of deleting image data and mail data.

FIG. 11 is a diagram showing timings of deleting image data and mail data at the time of transmission of the divided mails illustrated in the example of FIG. 10. In FIG. 11, the lateral direction indicates elapse of time. In the foregoing preferred embodiments, completion of transmission of the unit image of the first page is determined at time T1 when transmission to the mail server 2 is finished. At this time point, the image data and mail data are deleted. In the drawing, at time T4 after elapse of predetermined time TW from time T1, the image data and mail data of the first page are deleted. Similarly, the second and third pages are deleted at time T5 and T6 after elapse of the predetermined time TW since the unit images of the second and third pages are transmitted, respectively.

By deleting data after elapse of predetermined time, even when any of the divided mails is not delivered in a network such as the Internet, since image data and mail data are held as a unit image for predetermined time, the image can be re-transmitted more effectively.

Although both the image data and mail data are deleted on completion of transmission of the unit image in the foregoing preferred embodiments, only image data or mail data may be deleted. In such a case as well, the memory can be efficiently assured.

In the foregoing preferred embodiments, image data attached to E-mail is photoelectrically read and obtained. For example, image data received from the outside by E-mail or the like, image data obtained by being transferred by the facsimile function, and the like may be used.

Although an MFP is used as an example of an image processing apparatus which can perform a communication via a network in the preferred embodiments, the invention is not limited to the MFP. The invention can be applied to any image processing apparatus as long as it transmits image information via a network.

While the invention has been shown and described in detail, the foregoing description is in all aspects illustrative and not restrictive. It is therefore understood that numerous modifications and variations can be devised without departing from the scope of the invention.

What is claimed is:

1. An image processing apparatus comprising:
   an image input part for inputting image data;
   a converter for converting image data of a plurality of unit images obtained by said image input part into one file for transmission;
   a memory device for storing said file for transmission obtained by conversion of said converter;
   a divider for dividing said file for transmission into a plurality of divided files;
   a transmitter for sequentially transmitting said plurality of divided files via a network;
   a transmission completion detector for detecting completion of transmission of each of said plurality of divided files; and
   a memory device controller to maintain in the memory device a section of the file for transmission that corresponds to at least one untransmitted one of the plurality of unit images and, when completion of transmission of all divided files associated with at least one transmitted one of the plurality of unit images is detected by said transmission completion detector, to delete from said memory device a section of said file for transmission which corresponds to said at least one transmitted unit image, wherein the deleted section of the file for transmission corresponds to two or more of said plurality of divided files.

2. The image processing apparatus according to claim 1, wherein:
   said file for transmission includes a sequence of said image data of a plurality of unit images, and
   said divider divides said file for transmission at a border of at least two of the unit images in said sequence.

3. The image processing apparatus according to claim 1, wherein
   said file for transmission includes a sequence of said image data of a plurality of unit images, and
   said divider divides said file for transmission at at least one point that is within one of the unit images in said sequence.

4. The image processing apparatus according to claim 1, wherein said transmission completion detector determines completion of transmission of each unit image on the basis of completion of transmission of each divided file to a relay server for receiving and relaying each of the divided files via said network.

5. The image processing apparatus according to claim 1, wherein said transmission completion detector determines completion of transmission of each unit image after elapse of predetermined time since transmission of each of said plurality of divided files to said network.

6. The image processing apparatus according to claim 1, wherein said image input part includes a scanner for reading an image of an original.

7. The image processing apparatus according to claim 6, further comprising a printer for printing said image data obtained by said scanner.

8. The image processing apparatus according to claim 1, wherein said input part includes an image receiver for receiving image data via said network or a public telephone line.

9. The image processing apparatus according to claim 1, further comprising a printer for printing said image data obtained by said image input part.

10. The image processing apparatus according to claim 1, wherein said transmitter can perform a communication with a destination via a plurality of relay servers in said network and transmits said divided files to said relay server.

11. The image processing apparatus according to claim 1, wherein said transmitter transmits said divided file by E-mail.

12. The image processing apparatus according to claim 1, wherein said unit image is an image of one page.

13. The image processing apparatus according to claim 1, further comprising
   a table in which a correspondence relation between each unit image and each divided file is recorded,
   wherein said transmission completion detector determines whether transmission of divided files corresponding to a unit image has been completed or not with reference to said table.

14. An image processing apparatus comprising:
   an image input part for inputting image data;
   a memory device for storing image data of a plurality of unit images obtained by said image input part;
   a converter for converting the image data of the plurality of unit images obtained by said image input part into one file for transmission;
   a divider for dividing said file for transmission into a plurality of divided files;
   a transmitter for sequentially transmitting said plurality of divided files via a network;
   a transmission completion detector for detecting completion of transmission of each of said plurality of divided files; and
   a memory device controller to maintain in said memory device image data that corresponds to at least one untransmitted one of said plurality of unit images and, when completion of transmission of all divided files associated with at least one transmitted one of the plurality of unit images is detected by said transmission completion detector, to delete from said memory device image data which correspond to said at least one transmitted unit image, wherein the deleted image data corresponds to two or more of said plurality of divided files.

15. The image processing apparatus according to claim 14, wherein
   said file for transmission includes a sequence of said plurality of unit images, and
   said divider divides said file for transmission at a border of at least two of the unit images in said sequence.

16. The image processing apparatus according to claim 14, wherein
   said file for transmission includes a sequence of said image data of a plurality of unit images, and
   said divider divides said file for transmission at at least one point that is within one of the unit images in said sequence.

17. The image processing apparatus according to claim 14, wherein said transmission completion detector determines completion of transmission of each unit image on the basis of completion of transmission of each divided file to a relay server for receiving and relaying each of the divided files via said network.

18. The image processing apparatus according to claim 14, wherein said transmission completion detector determines completion of transmission of each unit image after elapse of predetermined time since transmission of each of said plurality of divided files to said network.

19. The image processing apparatus according to claim 14, wherein said transmitter can perform a communication with a destination via a plurality of relay servers in said network and transmits said divided files to said relay server.

20. The image processing apparatus according to claim 14, further comprising
a table in which a correspondence relation between each unit image and each divided file is recorded,
wherein said transmission completion detector determines whether transmission of divided files corresponding to a unit image has been completed or not with reference to said table.

21. An image processing apparatus comprising:
a scanner for reading a plurality of original images to obtain image data of a plurality of unit images;
a converter for converting the image data of the plurality of unit images obtained by said scanner into one file for transmission;
a memory device for storing said file for transmission obtained by conversion of said converter;
a divider for dividing said file for transmission into a plurality of divided files;
a transmitter for sequentially transmitting said plurality of divided files by E-mail;
a transmission confirmation part for confirming completion of transmission of each of said plurality of divided files;
a transmission determining part for determining whether transmission of all divided files associated with a unit image of said plurality of unit images has been completed or not each time said transmission confirmation part confirms completion of transmission of a divided file; and
a memory device controller to maintain in said memory device a section of said file for transmission that corresponds to an untransmitted one of said plurality of unit image, and to delete from said memory device a section of said file for transmission that corresponds to a transmitted one of said plurality of unit images when completion of transmission of all divided files associated with said transmitted unit image is determined by said transmission determining part,
wherein at least one section of said file for transmission that corresponds to one of said plurality of unit images extends over two or more of said plurality of divided files.

22. The image processing apparatus according to claim 21, wherein
said file for transmission includes a sequence of said image data of a plurality of unit images, and
said divider divides said file for transmission at a border of at least two of the unit images in said sequence.

23. The image processing apparatus according to claim 21, wherein
said file for transmission includes a sequence of said image data of a plurality of unit images, and
said divider divides said file for transmission at least one point that is within one of the unit images in said sequence.

24. The image processing apparatus according to claim 21, further comprising a table in which a correspondence relation between each unit image and each divided file is recorded, wherein said transmission determining part determines whether transmission of divided files corresponding to a unit image has been completed or not with reference to said table.

25. The image processing apparatus according to claim 21, wherein said memory device can store the image data of a plurality of unit images obtained by said scanner, and
when completion of transmission of divided files corresponding to a unit image is determined by said transmission determining part, said memory device controller deletes image data corresponding to the unit image which has already been transmitted from said memory device.

26. A method of transmitting image data, comprising:
inputting image data of a plurality of unit images;
converting said input image data into a file for transmission;
storing in a memory said file for transmission;
dividing said file for transmission into a plurality of divided files;
sequentially transmitting said plurality of divided files via a network;
determining completion of the transmission of each of said plurality of divided files;
maintaining in said memory a section of the file for transmission that corresponds to at least one untransmitted one of the plurality of unit images; and
deleting from said memory a section of said file for transmission that corresponds to at least one transmitted unit image of the plurality of unit images when completion of transmission of all divided files associated with said at least one transmitted unit image is determined, wherein the deleted section of the file corresponds to two or more of said plurality of divided files.

27. A method of transmitting image data, comprising:
reading an image of an original to obtain image data;
converting image data of a plurality of unit images obtained into one file for transmission;
storing in a memory said file for transmission;
dividing said file for transmission into a plurality of divided files;
storing said unit images;
sequentially transmitting said plurality of divided files by E-mail;
confirming completion of transmission of each of said plurality of divided files;
determining whether transmission of all divided files associated with a unit image of said plurality of unit images has been completed or not; and
deleting from said memory a section of said file for transmission that corresponds to a transmitted one of said plurality of unit images when completion of transmission of all divided files associated with said transmitted unit image is detected, wherein the deleted section of the file corresponds to two or more of said plurality of divided files.

28. A computer readable medium comprising a computer program configured to cause a computer processor to:
input image data of a plurality of unit images;
convert said input image data into a file for transmission;
store in a memory said file for transmission;
divide said file for transmission into a plurality of divided files;
sequentially transmit said plurality of divided files via a network;
determine completion of the transmission of each of said plurality of files;
store in said memory a section of said file for transmission that corresponds to an untransmitted one of said plurality of unit images; and delete from said memory a section of said file for transmission that corresponds to at least one transmitted one of said plurality of unit images when completion of transmission of all divided files associated with said transmitted unit image is determined, wherein the deleted section of the file corresponds to two or more of said plurality of divided files.

29. A computer-readable medium storing a program for controlling a computer to perform a method of processing an image, the method comprising:

inputting image data of a plurality of unit images;

converting said input image data into a file for transmission;

storing in a memory said file for transmission;

dividing said file for transmission into a plurality of divided files;

sequentially transmitting said plurality of divided files via a network;

determining completion of the transmission of each of said plurality of divided files;

maintaining in said memory a section of said file for transmission that corresponds to at least one untransmitted one of said plurality of unit images; and deleting from said memory a section of said file for transmission that corresponds to at least one transmitted one of said plurality of unit images when completion of transmission of all divided files associated with said transmitted unit image is determined, wherein the deleted section of the file corresponds to two or more of said plurality of divided files.

* * * * *